(12) United States Patent
Lorey

(10) Patent No.: US 10,583,754 B2
(45) Date of Patent: Mar. 10, 2020

(54) VEHICLE SEAT HAVING COMBINED ADJUSTMENT OPTIONS

(71) Applicant: GRAMMER AG, Amberg (DE)

(72) Inventor: Alexander Lorey, Maxhutte-Haidhof (DE)

(73) Assignee: GRAMMER AB, Amberg (DE)

( * ) Notice: Subject to any disclaimer, the term of this patent is extended or adjusted under 35 U.S.C. 154(b) by 56 days.

(21) Appl. No.: 15/612,081

(22) Filed: Jun. 2, 2017

(65) Prior Publication Data

US 2017/0349062 A1 Dec. 7, 2017

(30) Foreign Application Priority Data

Jun. 6, 2016 (DE) .................. 10 2016 110 404

(51) Int. Cl.
| | |
|---|---|
| *B60N 2/12* | (2006.01) |
| *B60N 2/07* | (2006.01) |
| *B60N 2/08* | (2006.01) |
| *B60N 2/22* | (2006.01) |
| *B60N 2/02* | (2006.01) |
| *B60N 2/58* | (2006.01) |
| *B60N 2/60* | (2006.01) |
| *B60N 2/68* | (2006.01) |

(52) U.S. Cl.
CPC ............. *B60N 2/12* (2013.01); *B60N 2/0284* (2013.01); *B60N 2/0732* (2013.01); *B60N 2/0745* (2013.01); *B60N 2/08* (2013.01); *B60N 2/22* (2013.01); *B60N 2/2209* (2013.01); *B60N 2/58* (2013.01); *B60N 2/6009* (2013.01); *B60N 2/686* (2013.01)

(58) Field of Classification Search
CPC ....... B60N 2/0284; B60N 2/12; B60N 2/2209
See application file for complete search history.

(56) References Cited

U.S. PATENT DOCUMENTS

| | | | | |
|---|---|---|---|---|
| 4,842,333 A | * | 6/1989 | Meiller ................. | A47C 1/032 297/318 |
| 5,269,588 A | * | 12/1993 | Kunz ..................... | B60N 2/12 297/322 |

(Continued)

FOREIGN PATENT DOCUMENTS

| | | |
|---|---|---|
| CN | 87106439 | 5/1988 |
| CN | 101112875 | 1/2008 |

(Continued)

OTHER PUBLICATIONS

Search Report prepared by the German Patent Office dated May 8, 2017, for German Patent Application No. 10 2016 110 404.3.

(Continued)

*Primary Examiner* — David R Dunn
*Assistant Examiner* — Tania Abraham
(74) *Attorney, Agent, or Firm* — Sheridan Ross P.C.

(57) ABSTRACT

The invention relates to a vehicle seat comprising a seat part and a backrest part, the seat part being configured shell-shaped on the lower face, at least one front end of the seat part being displaceable forwards and upwards in a combined manner and the inclination of the seat part being adjustable by means of an adjustment movement of the seat part with respect to a seat support shell arranged below the seat part.

26 Claims, 5 Drawing Sheets

(56) References Cited

U.S. PATENT DOCUMENTS

| | | | | |
|---|---|---|---|---|
| 5,622,406 | A * | 4/1997 | Meschkat | B60N 2/0284 248/395 |
| 5,692,802 | A * | 12/1997 | Aufrere | B60N 2/0284 297/311 |
| 6,053,575 | A * | 4/2000 | Bauer | B60N 2/0284 297/318 |
| 6,554,360 | B1 * | 4/2003 | Wilke | B60N 2/0284 297/284.4 |
| 7,874,618 | B2 * | 1/2011 | Kohl | B60N 2/2209 297/284.4 |
| 2006/0103211 | A1 | 5/2006 | Garrido | |
| 2007/0222270 | A1 | 9/2007 | Combest | |
| 2008/0252122 | A1 | 10/2008 | Vallentin | |
| 2011/0115270 | A1 | 5/2011 | Ropp et al. | |
| 2012/0318949 | A1 | 12/2012 | Braun | |
| 2013/0134756 | A1 | 5/2013 | Hisamoto | |
| 2013/0257113 | A1 | 10/2013 | Seibold et al. | |
| 2015/0165935 | A1 * | 6/2015 | Sachs | B60N 2/22 297/342 |

FOREIGN PATENT DOCUMENTS

| | | |
|---|---|---|
| CN | 202186304 | 4/2012 |
| CN | 202413485 | 9/2012 |
| CN | 103402813 | 11/2013 |
| CN | 105083071 | 11/2015 |
| DE | 8901594 U1 | 4/1989 |
| DE | 9421432 U1 | 2/1994 |
| DE | 69634852 T2 | 5/2006 |
| EP | 0392001 | 12/1994 |
| EP | 2174828 | 4/2010 |
| JP | 000S62110038 U | 7/1987 |
| JP | H06-14616 Y2 | 4/1994 |
| JP | 2002-078561 A | 3/2002 |
| JP | 2003-320880 | 11/2003 |
| JP | 2005-006853 A | 1/2005 |
| KR | 10 2005 0024 689 A | 3/2005 |
| WO | WO 92/07735 A1 | 5/1992 |
| WO | WO 00/21787 | 4/2000 |
| WO | WO 2004/052677 | 6/2004 |
| WO | WO 2012/083167 A1 | 6/2012 |

OTHER PUBLICATIONS

Extended Search Report for European Patent Application No. 17172179.8, dated Nov. 6, 2017, 3 pages.

Official Action with English Translation for China Patent Application No. 201710417797.9, dated Dec. 7, 2018, 12 pages.

Official Action with English Translation for China Patent Application No. 201710417797.9, dated Jul. 18, 2019, 12 pages.

* cited by examiner

VEHICLE SEAT HAVING COMBINED ADJUSTMENT OPTIONS

CROSS-REFERENCE TO RELATED APPLICATIONS

This application claims the benefit of German Patent Application No. DE 10 2016 110 404.3 filed Jun. 6, 2016, the entire contents of which are incorporated herein by reference.

FIELD

The invention relates to a vehicle seat comprising a seat part and a backrest part in accordance with the preamble of claim 1.

BACKGROUND

Various configurations for vehicle seats comprising adjustment devices for the depth or inclination of the seat part are known in the art. Seat depth means for example the distance between a front end of the seat part and the leaning face, in other words the front face, of the backrest part.

The adjustment options of these two parameters, "seat depth" and "seat inclination", are part of the standard provision of comfort seats and therefore part of the prior art. However, thus far the adjustment functions have been installed separately, and thus individually, and can also only be actuated individually.

SUMMARY

It is therefore an object of the present invention to develop the prior art in such a way that the two adjustment options are coupled into a combined adjustment. This means that for example using a handle the seat inclination can be changed simultaneously with the displacement of the seat cushion in or counter to the direction of travel.

This object is achieved by a vehicle seat comprising a seat part and a backrest part, the seat part being configured shell-shaped on the lower face, and at least a front end of the seat part being displaceable forwards and upwards in a combined manner and the inclination of the seat part being adjustable by means of an adjustment movement of the seat part with respect to a seat support shell arranged below the seat part.

Preferably, during a displacement of the seat cushion in the direction of travel, the inclination of the seat part is steeper, in other words greater. Analogously, during a displacement of the seat cushion counter to the direction of travel, the inclination of the seat part becomes flatter.

Thus, by means of a single adjustment movement of the seat part, a degree of depth and a degree of inclination of the seat part can be adjusted in a combined manner. This combined adjustment results in numerous advantages. Thus, the seat occupant can adjust both parameters simultaneously using only one handle or a single actuation of an actuation element. Since, in terms of the change therein, these parameters are preferably based on one another or on as comfortable a seat part adjustment as possible, an ideal comfort setting can be implemented in each case for a large proportion of seat occupants of different body sizes, as is explained further in the following with reference to the drawings.

Further, the costs of manufacturing and assembling the vehicle seat are naturally reduced, since the integrated technology is simplified.

Preferably, the dimensions of the seat part cannot be changed by means of the adjustment movement; thus, in other words, in particular a distance between the front end and the rear end of the seat part is configured always to be constant regardless of the position of the seat part.

The lower leg length should be understood to mean the distance of the vehicle floor or a positioning surface for the shoes of the seat occupant from a position of the knee of the seat occupant, which is arranged in turn above the seat face of the seat part. For example, the seat depth is naturally dependent on the thigh length of the seat occupant, and preferably corresponds thereto. Thus, the thigh length when the seat occupant is sitting down is measured as the distance between the buttocks and the hollow of the knee.

For a measurement of possible seat occupants in accordance with standard DIN CEN ISO/TR 7250-2, on average a first seat occupant, for whom 5% of all possible seat occupants are smaller than he is, has a lower leg length of 405 mm and a thigh length of 435 mm. Further, on average a second person, for whom 5% of all possible seat occupants are larger than he is, has a lower leg length of 520 mm and a thigh length of 540 mm.

A value of a lower leg length of the seat occupant has a statistical correlation of 0.64 to the seat depth. The correlation, which can be between 0 and 1 (or −1), describes the degree of dependency between two variables; thus, a value close to 1 (or −1) indicates a very strong correlation between the two variables, and this should be taken into account appropriately in the seat construction.

More preferably, the degree of inclination of the seat part is to be configured as a function of the degree of the seat depth, in such a way that in an ideal position the ratio of the lower leg length of the seat occupant to the thigh length (preferably corresponding to the seat depth) of the seat occupant is in a range of 0.93 to 0.97.

A preferred embodiment of the invention provides that by means of the adjustment movement of the seat part the front end and/or a rear end of the seat part are displaceable forwards along a curved path and/or along a straight line with respect to the seat support shell.

If the front end and rear end are treated as reference points, these movement lines (curved path and/or straight line) may each be considered a function graph of the position of the reference points. In other words, by means of the adjustment movement of the seat part, the front end of the seat part experiences either a straight movement or a curved movement. The same applies to the rear end. Maximum flexibility and optimum use of the installation space are thus provided.

A preferred variant provides that the rear end is displaceable along a straight line and the front end is displaceable along a curved path. A further preferred variant provides that the rear end and the front end are each displaceable along a curved path.

It is further preferred for the seat part to comprise grooves on the lower face and for sliding blocks formed in a complementary manner to be arranged on the upper face of the seat support shell, said sliding blocks being guidable within the grooves as sliding elements during the adjustment movement of the seat part with respect to the seat support shell. This configuration provides mechanically secure and reproducible guidance of the seat part with respect to the seat support shell.

In addition, the shape and progression of the grooves can be used so as to influence the change in the seat depth and/or seat inclination in a targeted manner. It is thus conceivable for the grooves to be arranged extending in the longitudinal direction and/or vertical direction of the vehicle seat; more preferably, a progression of the grooves is configured without changes in the transverse direction and thus always parallel to the transverse direction of the vehicle seat.

It is further conceivable for at least one groove, preferably two grooves in succession, to be arranged in the longitudinal direction of the vehicle seat. It is further conceivable for at least one groove, preferably two grooves, to be arranged extending side by side in the transverse direction of the vehicle seat.

Depending on the desired adjustment movement, these grooves can have a straight or curved progression with respect to the longitudinal direction of the vehicle seat.

It is also conceivable, instead of the described arrangement, for the grooves to be arranged on the seat support shell and for the sliding blocks to be rigidly connected to the seat part. Further, in both variants, elongate elevations may be used instead of the sliding blocks, and more preferably these are for example substantially triangular in cross section.

From standard DIN EN ISO 5353, it is known how to determine the seat index point (SIP) for a seat occupant of 75 kg body weight. This represents the point of intersection between the theoretical axes of the human upper body and the human thigh on the perpendicular plane through the seat centre line. Accordingly, the hip point (H point) of a human model is brought into correspondence with the SIP and simulates the position of the pelvis in the weight-loaded seat. According to the present invention and the compact construction thereof, it is possible to arrange the SIP relatively low, contributing to the comfort of the seat occupant.

Further, in the seat according to the invention, the guide elements for guiding the adjustment movement of the seat part are arranged exclusively between the seat part and the seat shell element, thus in particular below the seat part and above the seat shell element. By contrast, in particular the space laterally alongside the seat part and alongside the seat support shell is free from guide elements configured for the adjustment movement according to the invention of the seat part.

So as further to improve the comfort of the seat occupant, it has been found expedient in practice for a position of the seat part to be lockable with respect to a position of the seat support shell by means of a manually releasable locking device, the locking device comprising a manual actuation lever arranged on the seat part and comprising material recesses into which at least one web element, configured in a complementary manner and arranged on the seat support shell, can latch. This actuation lever may be configured in a simple construction as a perforated metal sheet.

In this context, the at least one or more individual web elements penetrate the corresponding material recesses, causing the actuation lever, which is preferably arranged at the front end of the seat part, more preferably on a lower face of the seat part and even more preferably at least in part between the grooves arranged on the lower face of the seat part, and thus the seat part to be fixed on the seat support shell. In this state, the position of the seat part with respect to the seat support shell is locked.

If the actuation lever is deflected upwards, for example by being gripped by the seat occupant, the web elements on the seat support shell disengage from the material recesses on the actuation lever, undoing the locking of the position of the seat part with respect to the seat support shell. Thus, in this state, the adjustment movement of the seat part with respect to the seat support shell can be carried out.

In practice, it has been found to be expedient, in particular in relation to the size distribution of the seat occupants, if for the adjustment movement of the seat part a first maximum adjustment distance of the front end of the seat part forwards with respect to the seat support shell is in a range of 40 mm to 80 mm, preferably 60 mm, and/or a second maximum adjustment distance of the front end of the seat part upwards with respect to the seat support shell is in a range of 10 mm to 30 mm, preferably 20 mm. These dimensions are also appropriate to the spatial relationships within a small vehicle.

It has further been found to be expedient if for the adjustment movement of the seat part the inclination of the seat part in a rear maximum position of the seat part has a difference of 2° to 10°, preferably 5°, from the inclination of the seat part in a front maximum position of the seat part.

When the seat part is in the rear maximum position, it is preferred for the rear end of the seat part and a rear face of the backrest part to be arranged substantially on a line as viewed in the longitudinal direction of the seat. Further, in this case the seat part and the backrest part are preferably formed directly mutually adjacent.

When the seat part is in the front maximum position, it is preferred for the rear end of the seat part and a front face of the backrest part to be arranged substantially on a line as viewed in the longitudinal direction of the seat. Further, in this case the seat part and the backrest part are preferably formed spaced apart from one another.

These above preferred arrangements apply in particular if the backrest part is arranged substantially vertical, in other words having the longitudinal extension thereof substantially parallel to the vertical direction of the seat.

So as to guarantee the user a high degree of comfort, especially in the front maximum position, in spite of the distance between the seat part and the backrest part, it has been found to be advantageous if the rear end of the seat part is connected to a lower end of the backrest part by means of a resilient connection. This resilient connection is preferably configured over the entire width of the seat part and can for example be configured by means of a rubber band which supports the buttocks of the seat occupant. However, the adjustment movement of the seat part is decoupled from the backrest part. As an alternative to a resilient connection, it may be advantageous if the seat part is arranged at a distance from the backrest part and without a connecting element thereto.

It is further preferred for the backrest part to be connected to the seat support shell and/or to be pivotable with respect to the seat support shell independently of the adjustment movement of the seat part. This also ensures increased comfort for the seat occupant. Moreover, the mechanics of the pivoting of the backrest part can be simplified if it is connected to an element such as the seat support shell, said element in this case preferably being arranged fixed with respect to the remaining components of the vehicle seat.

BRIEF DESCRIPTION OF THE DRAWINGS

Advantageous embodiments may be derived from the dependent claims.

Advantages and benefits can be derived from the following description in connection with the drawings, in which.

DETAILED DESCRIPTION

Figure 1A:
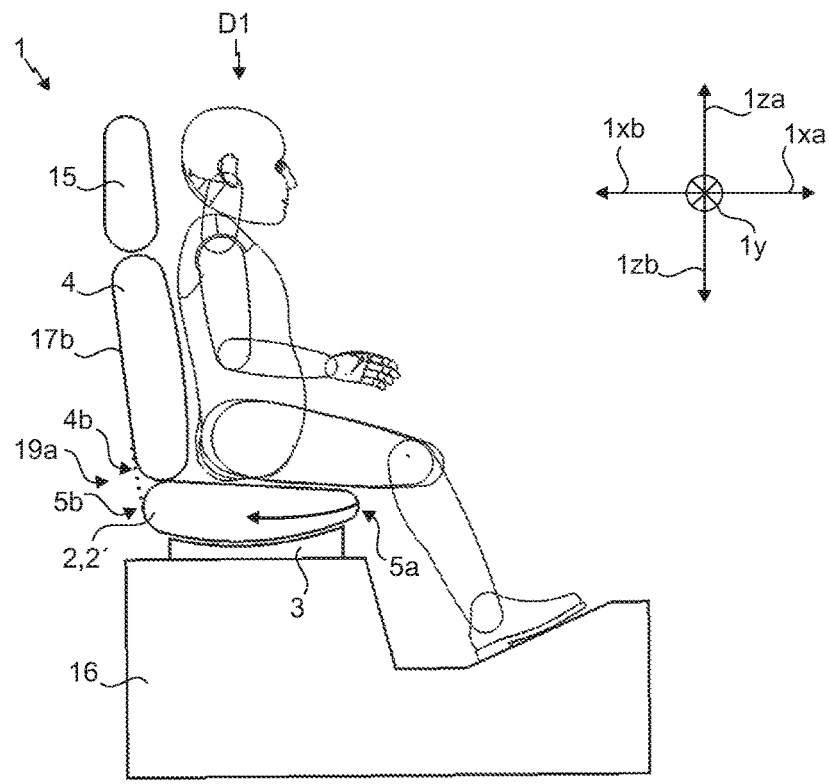
FIGS. 1a-1c are schematic side views of various positions of the seat part of the vehicle seat according to the invention.
Figure 1B:
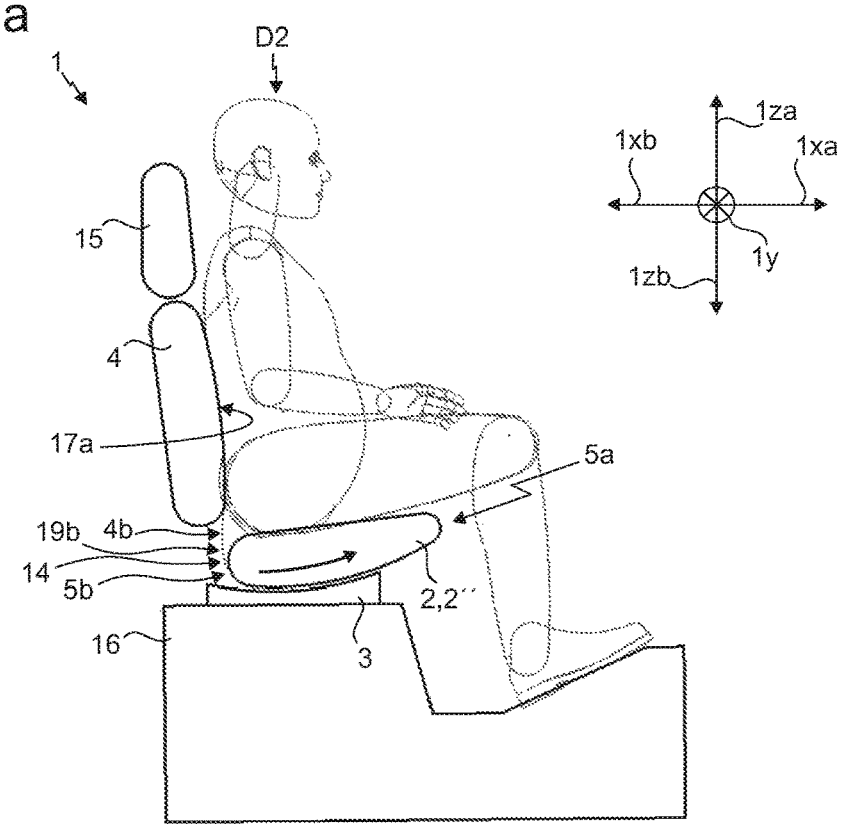

FIGS. 1a and 1b are each a schematic side view of a vehicle seat 1 according to the invention. This vehicle seat 1, having longitudinal direction 1x, transverse direction 1y and vertical direction 1z, in the present case comprises a headrest part 15, a backrest part 4, a seat part 2 and a seat support shell 3. For example, the seat support shell 3 can be connected to a body 16 of a vehicle (not shown).

Dummies D1, D2, shown on the vehicle seats 1 of FIG. 1a and FIG. 1b, provide a simplified representation of the two limits between which 90% of the sizes of all possible seat occupants fall. In other words, 5% of all possible seat occupants are smaller than dummy D1 and a further 5% of all possible seat occupants are larger than dummy D2. The vehicle seat 1 according to the invention is thus suitable for at least 90% of all possible seat occupants.

In the following, the inclination of the seat 1 is to be defined in such a way that a positive inclination means that as viewed in the direction of travel 1xa the rear end 5b of the vehicle seat 1 is positioned lower in the vertical direction 1z than the front end 5a (as shown in FIG. 1b). Conversely, a negative inclination means that the rear end 5b of the vehicle seat 1 is higher in the vertical direction 1z than the front end 5a. By contrast, FIG. 1a shows an inclination of zero.

The front end 5a and the rear end 5b of the seat part 2 should in particular be understood as forming reference points arranged halfway up the height of the seat part 2. Analogously, the lower end 4b of the backrest part 4 should be understood as a reference point arranged halfway across the width of the backrest part 4.

Dummy D1 is for example a woman who because of her small body size has arranged the seat part 2 in such a way that it is in a rear maximum position 2' in terms of depth. Thus, the inclination of the seat part 2 is in the present case at a minimum position and is in the present case equal to zero. However, it would also be conceivable for the minimum position to constitute a small negative or small positive value.

By contrast, dummy D2 is for example a man who because of his tall body size has arranged the seat part 2 in such a way that it is in a front maximum position 2" in terms of depth. Thus, the inclination of the seat part 2 is in the present case at a maximum position and is in the present case for example 5° higher than the inclination of the seat part 2 in the minimum position.

In FIG. 1a, it can be seen that the rear end 5b of the seat part 2 and a rear face 17b of the backrest part 4 are arranged substantially on a first line 19a (shown dashed) as viewed in the longitudinal direction 1xa, 1xb of the seat 1. Further, in this case the seat part 2 and the backrest part 4 are formed directly mutually adjacent; in this case, at least the lower end 4b of the backrest part 4 makes contact with the seat part 2.

In FIG. 1b, it can be seen that the rear end 5b of the seat part 2 and a front face 17a of the backrest part 4 are arranged substantially on a second line 19b (shown dashed) as viewed in the longitudinal direction 1xa, 1xb of the seat 1. Further, in this case the seat part 2 and the backrest part 4 are formed spaced apart from one another.

These above preferred arrangements apply to the situation shown in FIGS. 1a and 1b, where the backrest part 4 is arranged substantially perpendicular, in other words having the longitudinal extension thereof parallel to the vertical direction 1z of the seat 1.

In the present case, the seat part 2 is formed in a shell shape on the lower face, the front end 5a of the seat part 2 being displaceable forwards 1xa and upwards 1za in a combined manner with respect to the seat support shell 3 arranged below the seat part 2, and the inclination of the seat part 2 thus being adjustable, by means of the adjustment movement of the seat part 2.

Preferably the headrest part 15 is mechanically fixedly connected to the backrest part 4. More preferably, the head rest part 15 is arranged in a pivotable and/or height-adjustable manner with respect to the backrest part 4.

The backrest part 4 is in the present case connected to the seat support shell 3 by means of a mechanically fixed connection (not shown) and arranged pivotably with respect to the seat support shell 3, in such a way that the inclination of the backrest part 4 is adjustable. Alternatively, the backrest part 4 may be mechanically rigidly connected to the seat support shell 3.

FIG. 1b indicates a resilient connection 14 by means of which the rear end 5b of the seat part 2 is connected to a lower end 4b of the backrest part 4. For example, this resilient connection 14 is in the form of a flexible material portion or a rubber material.

As can be seen in particular from a comparison of FIGS. 1a and 1b, the adjustment movement of the seat part 2 is decoupled from the backrest part 4. In other words, neither the position nor the inclination nor a curvature of the backrest part 4 is changed when the adjustment movement of the seat part 2 takes place. Conversely, it is naturally also the case that a pivot movement of the backrest part 4 is decoupled from an adjustment movement of the seat part 2, in such a way that the position of the seat part 2 is also not changed when the backrest part 4 is pivoted.

Figure 1C:
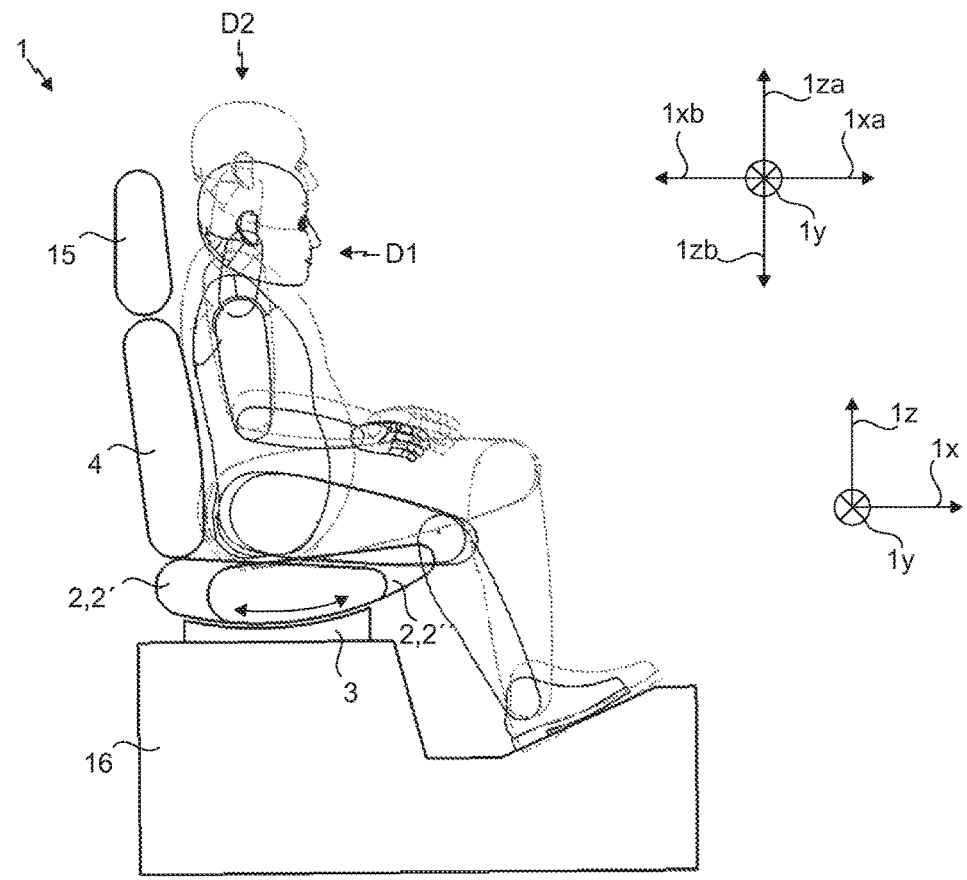

In FIG. 1c, for better comparison, the two dummies D1, D2 are shown superposed on one another.

Figure 2A:
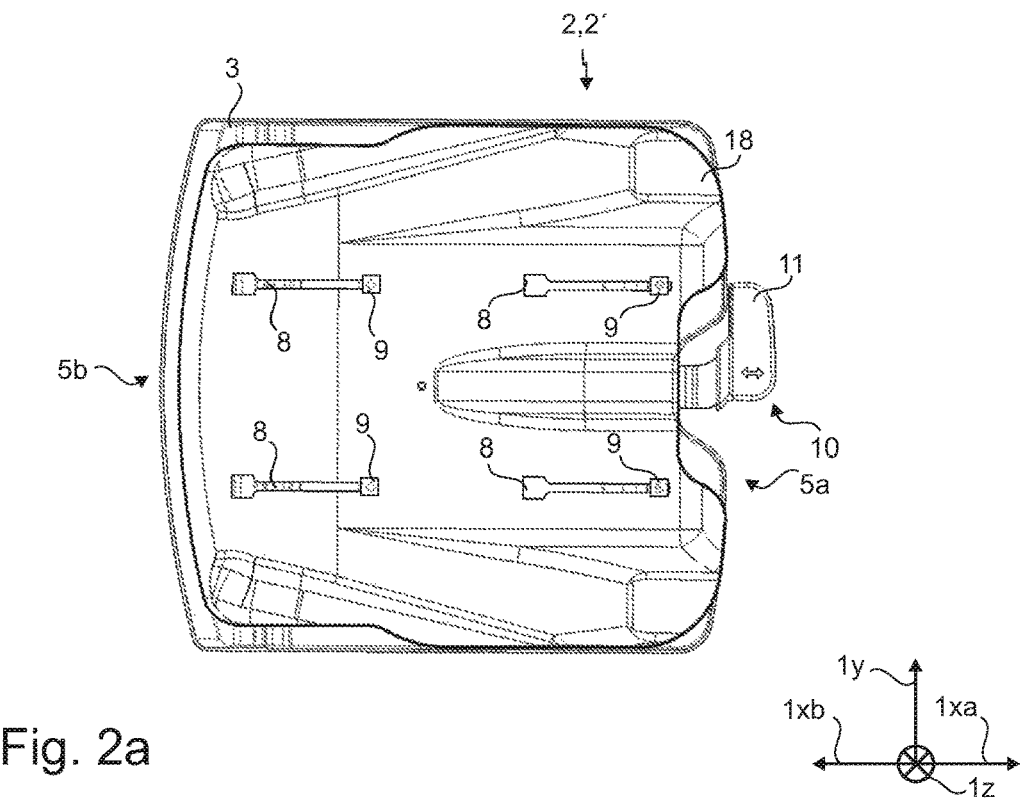
FIGS. 2a-2g are various views and adjustment positions of the seat part and the seat shell.
Figure 2B:
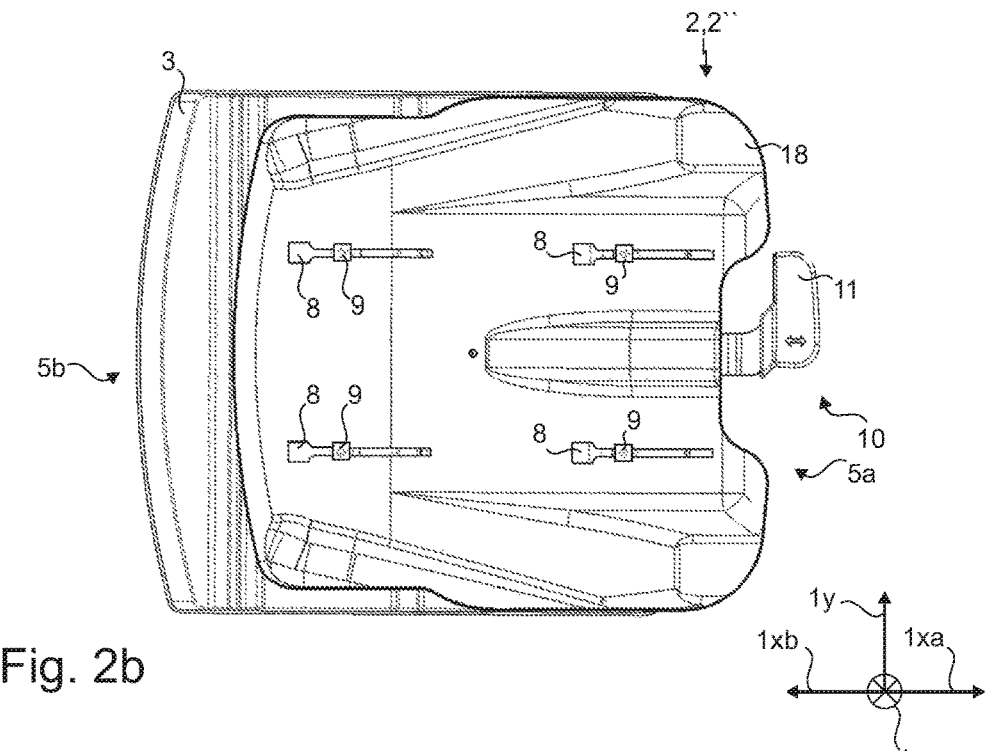
Figure 2C:
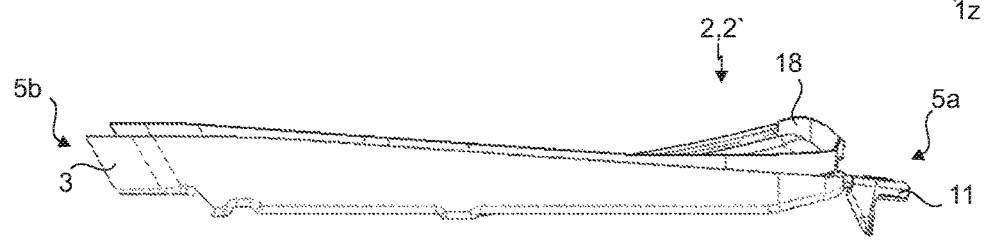
Figure 2D:
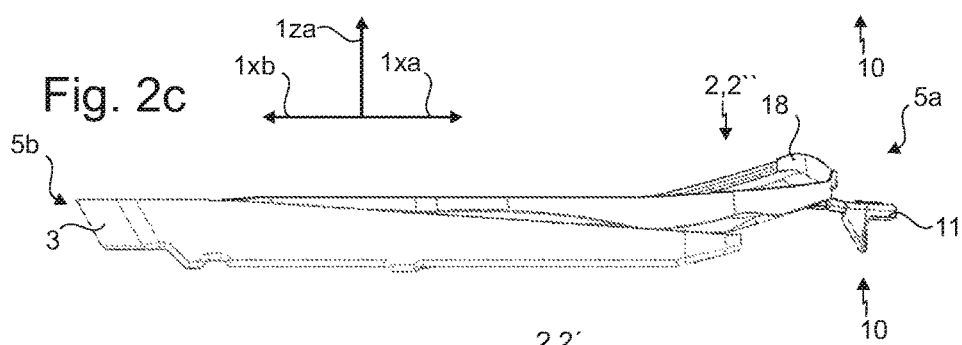
Figure 2G:
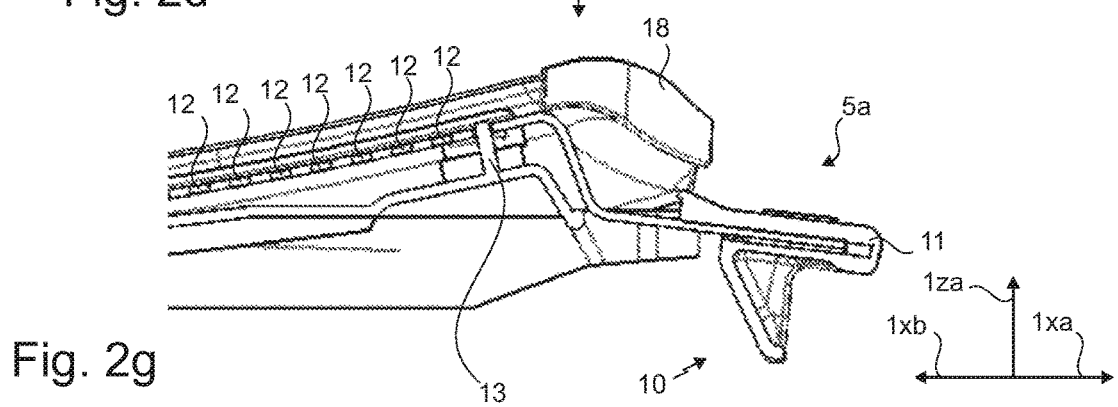
Figure 2E:
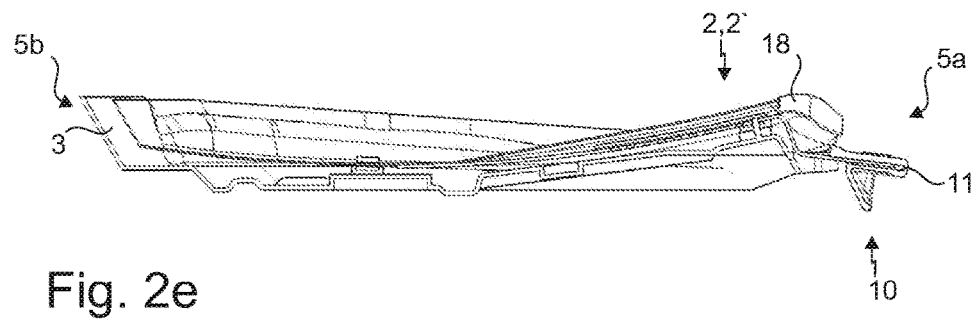
Figure 2F:
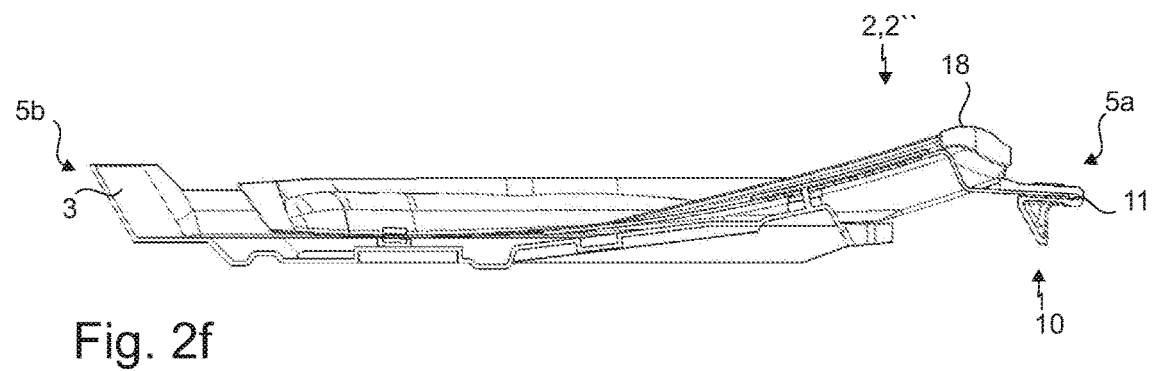

In the views of FIGS. 2a and 2b, 2c and 2d, and 2e and 2f, the unlined seat part 2 is shown without a cushion part or a seat part shell 18 of the seat part 2, in various positions with respect to the seat support shell 3. In this context, FIGS. 2a, 2c and 2e show the rear maximum position 2', and FIGS. 2b, 2d and 2f show the front maximum position 2" of the seat part 2. FIGS. 2a and 2b are plan views, FIGS. 2c and 2d are side views, and FIGS. 2e and 2f are cross-sectional views of the arrangement of the seat part shell 18 and the seat support shell 3. Further, FIG. 2g is a detail of FIG. 2e.

Grooves (8), in the present case four in number, are formed in the seat part 2 or in the seat part shell 18, in each case two being arranged in succession (one thereof adjacent to the front end 5a and another thereof adjacent to the rear end 5b) and in each case two being arranged mutually parallel and at the same level in the longitudinal direction of the seat 1. The grooves 8 have end stops, meaning that a progression of the grooves 8 and thus of the adjustment path of the seat part 2 is delimited in the longitudinal direction 1xa, 1xb of the seat 1.

At the same time, sliding blocks 9 are shown, which are arranged on the upper face of the seat support shell 3 and complementary to the grooves 8. During the adjustment movement of the seat part 2 with respect to the seat support shell 3, these sliding blocks 9 are guidable within the grooves 8 as sliding elements. It can clearly be seen that the position of the sliding blocks 9 relative to the grooves 8 changes by comparison from FIG. 2*a* to FIG. 2*b*.

Preferably, these sliding blocks 9 are configured using three portions. A first portion forms the connection to the seat support shell 3. A second portion, following the first portion, is arranged passing through the grooves 8 of the seat part shell 18. A third portion, following the second portion, is arranged on the face of the seat part shell remote from the seat support shell 3, and preferably configured wider than the width of the grooves 8, in such a way that by positive fit a secure connection is provided between the seat part 2 and the seat support shell 3.

A manually releasable locking device 10, by means of which the position of the seat part 2 with respect to a position of the seat support shell 3 can be locked, is also shown, in particular in FIGS. 2*e* and 2*f*. This locking device 10 comprises a manual actuation lever 11, arranged at the front end 5*a* of the seat part 2 and comprising material recesses 12, which are in the present case formed rectangular and into which a web element 13 formed in a complementary manner can latch. This web element 13 is arranged on the seat support shell 3.

The cooperation of the web element 13 and the material recesses 12 is shown enlarged in FIG. 2*g*. It is clear that the web element 13 in FIG. 2*e* is latched into a material recess 12 facing closer to the actuation lever 11 than in FIG. 2*f*.

Figure 3:
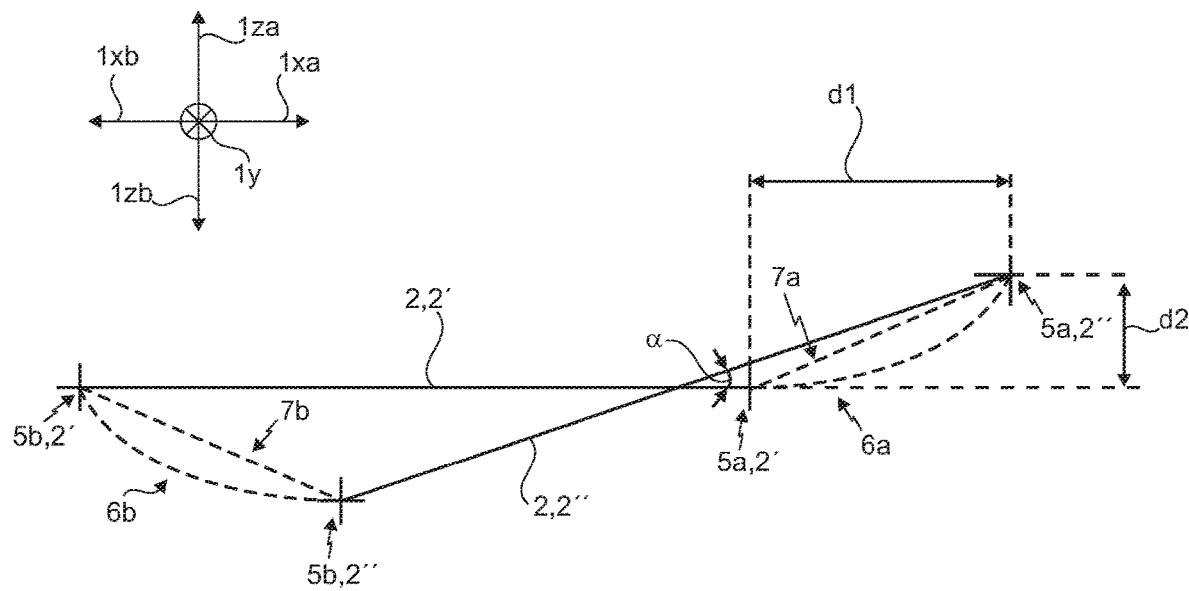
FIG. 3 is a schematic diagrams showing various adjustment movements of the seat part with respect to the seat support shell by way of illustrated curved paths and straight lines.

FIG. 3 provides schematic diagrams of various guide geometries by means of which the adjustment movement of the seat part 2 can be implemented. For this purpose, a first point is shown, representing the position of the rear end 5*b* of the seat part 2 in the rear maximum position 2'. In the example shown, in the longitudinal direction 1*xa*, 1*xb* of the vehicle seat 1 this point is positioned at the same level as a second point, representing the position of the front end 5*a* of the seat part 2 in the rear maximum position 2'.

A third point, representing the position of the rear end 5*b* of the seat part 2 in the front maximum position 2", and a fourth point, representing the position of the front end 5*a* of the seat part 2 in the front maximum position 2", are also shown.

The first and third points and the second and fourth points are in each case interconnected by a line, these lines representing the inclinations of the seat part 2 in the rear maximum position 2' and in the front maximum position 2".

The first and second points and the third and fourth points are in each case interconnected by a line and a circle arc. In this context, the lines represent the straight lines 7*a*, 7*b* and the circle arcs represent the curved paths 6*a*, 6*b* along which the front end 5*a* and/or a rear end 5*b* of the seat part 2 are displaceable with respect to the seat support shell 3 by means of the adjustment movement of the seat part 2.

Distances d1 and d2 are also shown, and for the adjustment movement of the seat part 2 represent the first maximum adjustment distance of the front end 5*a* of the seat part 2 forwards 1*xa* with respect to the seat support shell 3 (d1) and the second maximum adjustment distance of the front end 5*a* of the seat part 2 upwards 1*za* with respect to the seat support shell 3 (d2).

Further, an angle α between the longitudinal extension of the seat part 2 in the rear maximum position 2' and the longitudinal extension of the seat part 2 in the front maximum position 2" is shown, and illustrates the maximum change in the degree of inclination of the seat part 2.

The seat part 2 is shown from diagonally above again in FIG. 4*a* and from diagonally below in FIG. 4*b*, in each case without a cushion part, in such a way that the unlined seat part shell 18 of the seat part 2 can be seen. The continuously arranged grooves 8 can be seen in this seat part shell 18 of the seat part 2.

Preferably, the progression of the grooves 8 forms one of the variants shown in FIG. 3, in such a way that the adjustment movement of the seat part 2 takes place on the straight lines 7*a* and 7*b*, on the curved paths 6*a* and 6*b*, on the straight line 7*a* and the curved path 6*b*, or on the straight line 7*b* and the curved path 6*a*.

Figure 4A:
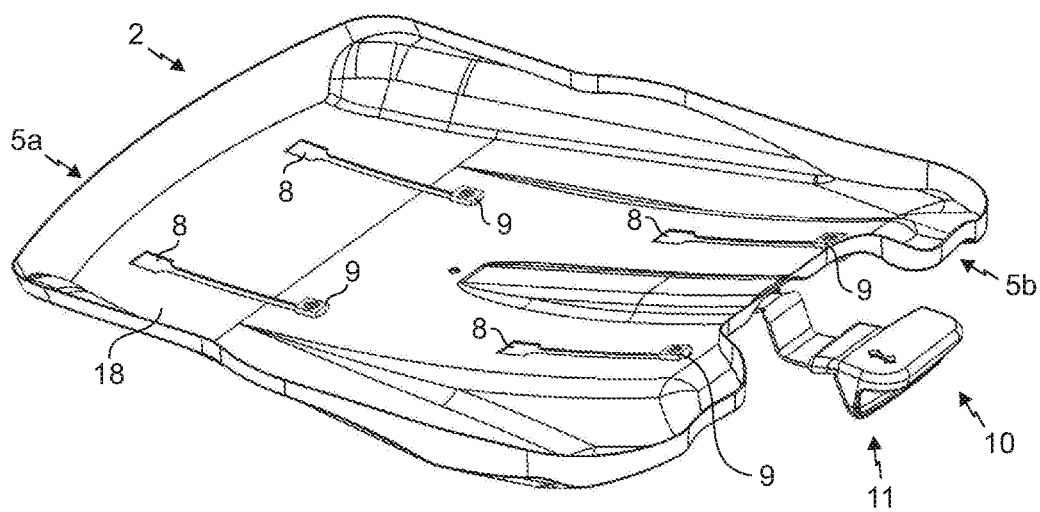
FIGS. 4a-4c are various views of the seat part and the seat shell.
Figure 4B:
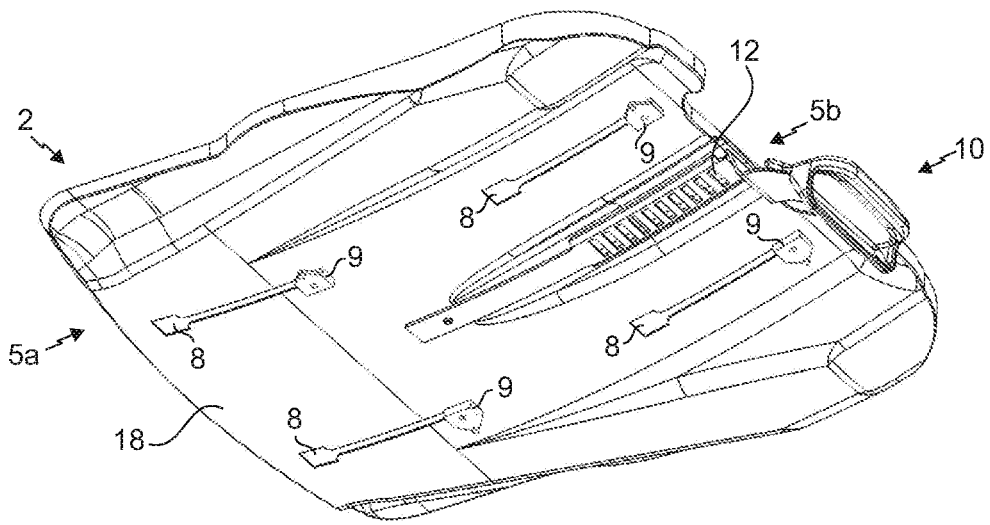
Figure 4C:
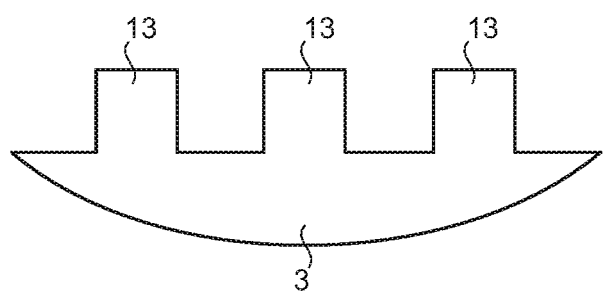

FIGS. 4*a* and 4*b* also show the manually releasable locking device 10, by means of which a position of the seat part 2 with respect to a position of the seat support shell 3 can be locked. In this context, FIG. 4*c* shows a further variant, in which not just one, but a plurality of web elements 13 are arranged on the seat support shell 3. This increases the reliability of the locking.

All features disclosed in the application documents are claimed as essential to the invention if they are novel over the prior art individually or in combination.

LIST OF REFERENCE NUMERALS

1 Vehicle seat
1*x* Longitudinal direction
1*xa* Forward direction, direction of travel
1*xb* Rearward direction
1*y* Transverse direction
1*z* Vertical direction
1*za* Upward direction
1*zb* Downward direction
2 Seat part
2', 2" Maximum position
3 Seat support shell
4 Backrest part
4*b*, 5*a*, 5*b* End
6*a*, 6*b* Curved path
7*a*, 7*b* Straight line
8 Groove
9 Groove stone
10 Locking device
11 Actuation lever
12 Material recess
13 Web element
14 Resilient connection
15 Headrest part
16 Body
17*a*, 17*b* Surface
18 Seat part shell
19*a*, 19*b* Line
d1, d2 Distance
D1, D2 Dummy
α Angle

The invention claimed is:

1. A vehicle seat, comprising:
 a seat part; and
 a backrest part, wherein the seat part is configured shell-shaped on a lower face, wherein at least one front end of the seat part is displaceable forwards and upwards in a combined manner, wherein an inclination of the seat part is adjustable by means of an adjustment movement of the seat part with respect to a seat support shell arranged below the seat part, wherein, by means of the adjustment movement of the seat part, a rear end of the seat part is displaceable along a straight line and the front end of the seat part is displaceable along a curved path with respect to the seat support shell, wherein the seat part comprises grooves on the lower face and sliding blocks formed in a complementary manner are arranged on an upper face of the seat support shell, said sliding blocks being guidable within the grooves as sliding elements during the adjustment movement of the seat part with respect to the seat support shell.

2. The vehicle seat according to claim 1, wherein a position of the seat part is lockable with respect to a position of the seat support shell by means of a manually releasable locking device, the locking device comprising a manual actuation lever arranged on the seat part and comprising material recesses into which at least one web element, configured in a complementary manner and arranged on the seat support shell, can latch.

3. The vehicle seat according to claim 1, wherein for the adjustment movement of the seat part a first maximum adjustment distance of the front end of the seat part forwards with respect to the seat support shell is in a range of 40 mm to 80 mm.

4. The vehicle seat according to claim 3, wherein a second maximum adjustment distance of the front end of the seat part upwards with respect to the seat support shell is 20 mm.

5. The vehicle seat according to claim 3, wherein for the adjustment movement of the seat part a second maximum adjustment distance of the front end of the seat part upwards with respect to the seat support shell is in a range of 10 mm to 30 mm.

6. The vehicle seat according to claim 5, wherein the first maximum adjustment distance of the front end of the seat part forwards with respect to the support shell is 60 mm.

7. The vehicle seat according to claim 1, wherein for the adjustment movement of the seat part the inclination of the seat part in a rear maximum position of the seat part has a difference of 2° to 10° from the inclination of the seat part in a front maximum position of the seat part.

8. The vehicle seat according to claim 7, wherein the difference is 5°.

9. The vehicle seat according to claim 1, wherein the rear end of the seat part is connected to a lower end of the backrest part by means of a resilient connection, the adjustment movement of the seat part being decoupled from the backrest part.

10. The vehicle seat according to claim 1, wherein the backrest part is connected to the seat support shell.

11. The vehicle seat according to claim 1, wherein for the adjustment movement of the seat part a second maximum adjustment distance of the front end of the seat part upwards with respect to the seat support shell is in a range of 10 mm to 30 mm.

12. The vehicle seat according to claim 11, wherein a first maximum adjustment distance of the front end of the seat part forwards with respect to the support shell is 60 mm.

13. The vehicle seat according to claim 1, wherein the backrest part is pivotable with respect to the seat support shell independently of the adjustment movement of the seat part.

14. A vehicle seat, comprising:
a seat part; and
a backrest part, wherein the seat part is configured shell-shaped on a lower face, wherein at least one front end of the seat part is displaceable forwards and upwards in a combined manner, wherein an inclination of the seat part is adjustable by means of an adjustment movement of the seat part with respect to a seat support shell arranged below the seat part, wherein, by means of the adjustment movement of the seat part, a rear end of the seat part is displaceable along a straight line and the front end of the seat part is displaceable along a curved path with respect to the seat support shell, wherein the rear end of the seat part is connected to a lower end of the backrest part by means of a resilient connection, the adjustment movement of the seat part being decoupled from the backrest part.

15. The vehicle seat according to claim 14, wherein guide elements are located on the lower face, wherein the guide elements include grooves on the lower face and sliding blocks formed in a complementary manner are arranged on an upper face of the seat support shell, said sliding blocks being guidable within the grooves as sliding elements during the adjustment movement of the seat part with respect to the seat support shell.

16. The vehicle seat according to claim 14, wherein a position of the seat part is lockable with respect to a position of the seat support shell by means of a manually releasable locking device, the locking device comprising a manual actuation lever arranged on the seat part and comprising material recesses into which at least one web element, configured in a complementary manner and arranged on the seat support shell, can latch.

17. The vehicle seat according to claim 14, wherein for the adjustment movement of the seat part a first maximum adjustment distance of the front end of the seat part forwards with respect to the seat support shell is in a range of 40 mm to 80 mm.

18. The vehicle seat according to claim 17, wherein a second maximum adjustment distance of the front end of the seat part upwards with respect to the seat support shell is 20 mm.

19. The vehicle seat according to claim 17, wherein for the adjustment movement of the seat part a second maximum adjustment distance of the front end of the seat part upwards with respect to the seat support shell is in a range of 10 mm to 30 mm.

20. The vehicle seat according to claim 19, wherein the first maximum adjustment distance of the front end of the seat part forwards with respect to the support shell is 60 mm.

21. The vehicle seat according to claim 14, wherein for the adjustment movement of the seat part the inclination of the seat part in a rear maximum position of the seat part has a difference of 2° to 10° from the inclination of the seat part in a front maximum position of the seat part.

22. The vehicle seat according to claim 21, wherein the difference is 5°.

23. The vehicle seat according to claim 14, wherein the backrest part is connected to the seat support shell.

24. The vehicle seat according to claim 14, wherein for the adjustment movement of the seat part a second maximum adjustment distance of the front end of the seat part upwards with respect to the seat support shell is in a range of 10 mm to 30 mm.

25. The vehicle seat according to claim 24, wherein a first maximum adjustment distance of the front end of the seat part forwards with respect to the support shell is 60 mm.

26. The vehicle seat according to claim 14, wherein the backrest part is pivotable with respect to the seat support shell independently of the adjustment movement of the seat part.

* * * * *